(12) United States Patent
Diez Herrera

(10) Patent No.: US 9,156,414 B2
(45) Date of Patent: Oct. 13, 2015

(54) ROOF CLIP FOR FASTENING ACCESSORIES TO THE PANELS OF VEHICLES

(75) Inventor: Victor Diez Herrera, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 445 days.

(21) Appl. No.: 13/387,920

(22) PCT Filed: Apr. 27, 2010

(86) PCT No.: PCT/ES2010/000184
§ 371 (c)(1),
(2), (4) Date: Jan. 30, 2012

(87) PCT Pub. No.: WO2011/012739
PCT Pub. Date: Feb. 3, 2011

(65) Prior Publication Data
US 2012/0125960 A1    May 24, 2012

(30) Foreign Application Priority Data

Jul. 31, 2009 (ES) .................................. 200901700

(51) Int. Cl.
*F16B 37/04* (2006.01)
*B60R 13/02* (2006.01)

(52) U.S. Cl.
CPC ............ *B60R 13/0206* (2013.01); *F16B 37/043* (2013.01)

(58) Field of Classification Search
CPC ....... B60N 3/026; F16B 21/075; F16B 5/126; F16B 37/043; B60R 13/0206

USPC .............. 24/293, 294, 296, 581.11, 457, 458; 296/210, 97.9, 214; 411/103, 111, 112, 411/172–177
See application file for complete search history.

(56) References Cited

U.S. PATENT DOCUMENTS

| 2,815,789 A | * | 12/1957 | Hutson et al. | .................. 411/111 |
| 2,908,311 A | * | 10/1959 | Garman | .......................... 411/103 |
| 3,205,546 A | * | 9/1965 | Nelson | ............................. 24/292 |
| 3,362,278 A | * | 1/1968 | Munse | ........................... 411/437 |
| 3,486,158 A | * | 12/1969 | Soltysik et al. | ................. 439/92 |

(Continued)

FOREIGN PATENT DOCUMENTS

| CN | 1558842 A | 12/2004 |
| ES | 2107378 A1 | 11/1997 |

(Continued)

OTHER PUBLICATIONS

ISR for PCT/ES2010/000184 dated Aug. 18, 2010.

*Primary Examiner* — Victor Batson
*Assistant Examiner* — Jason W San
(74) *Attorney, Agent, or Firm* — Lowe Hauptman & Ham LLP

(57) ABSTRACT

Roof clip for attaching accessories to the panels of vehicles, designed to be inserted in an opening made in said panels, the clip being assembled to the modular roof system, along with the accessory, and secured by a screw, in which there is a base having a hole with a screw thread, openings in said base, and side wings, the fold of which provides a surface for contact with said panel, and also flanges for removing said clip from said panel, comprising the superposition of a lower base with said intermediate base, keeping said screw thread of said intermediate base aligned with the lower hole in said lower base.

25 Claims, 6 Drawing Sheets

(56) References Cited

U.S. PATENT DOCUMENTS

| | | | |
|---|---|---|---|
| 4,606,688 A * | 8/1986 | Moran et al. | 411/175 |
| 4,925,351 A * | 5/1990 | Fisher | 411/182 |
| 5,249,900 A * | 10/1993 | Mitts | 411/182 |
| 5,636,891 A * | 6/1997 | Van Order et al. | 296/37.7 |
| 5,857,735 A * | 1/1999 | Alonso Cuesta | 296/214 |
| 6,438,804 B1 * | 8/2002 | Romero Magarino | 24/289 |
| 6,453,522 B1 * | 9/2002 | Romero Magarino et al. | 24/458 |
| 6,606,766 B2 * | 8/2003 | Ko | 24/295 |
| 6,629,809 B2 * | 10/2003 | Vassiliou | 411/173 |
| 6,644,713 B2 * | 11/2003 | Del Pozo Abejon et al. | 296/39.1 |
| 6,908,274 B1 * | 6/2005 | Vassiliou | 411/437 |
| 6,976,292 B2 | 12/2005 | MacPherson et al. | |
| 7,086,125 B2 * | 8/2006 | Slobodecki et al. | 24/295 |
| 7,152,281 B2 * | 12/2006 | Scroggie | 24/297 |
| 7,168,138 B2 * | 1/2007 | Lubera et al. | 24/295 |
| 7,186,051 B2 * | 3/2007 | Benedetti et al. | 403/388 |
| 7,293,824 B2 * | 11/2007 | Dobson | 296/214 |
| 7,356,886 B2 * | 4/2008 | Okada | 24/297 |
| 7,568,870 B2 * | 8/2009 | Paquet | 411/177 |
| 7,640,635 B2 * | 1/2010 | Kim et al. | 24/295 |
| 7,878,745 B2 * | 2/2011 | Allen et al. | 411/175 |
| 8,016,530 B2 * | 9/2011 | Johnson et al. | 411/173 |
| 8,083,450 B1 * | 12/2011 | Smith et al. | 411/112 |
| 8,156,615 B2 * | 4/2012 | Komeno et al. | 24/297 |
| 8,376,392 B2 * | 2/2013 | Staebler et al. | 280/728.2 |
| 8,568,073 B2 * | 10/2013 | Eberle et al. | 411/112 |
| 8,579,570 B2 * | 11/2013 | Fellows et al. | 411/112 |
| 8,627,552 B2 * | 1/2014 | Smith et al. | 24/295 |
| 2002/0100146 A1 * | 8/2002 | Ko | 24/295 |
| 2004/0049894 A1 * | 3/2004 | Jackson et al. | 24/293 |
| 2005/0117993 A1 | 6/2005 | Vassiliou | |
| 2005/0271492 A1 * | 12/2005 | Jackson et al. | 411/112 |
| 2007/0046054 A1 * | 3/2007 | Hinman et al. | 296/1.07 |
| 2007/0224018 A1 * | 9/2007 | DePerro et al. | 411/175 |
| 2008/0019794 A1 * | 1/2008 | van Walraven | 411/175 |
| 2008/0086850 A1 * | 4/2008 | Smith et al. | 24/289 |
| 2008/0095592 A1 * | 4/2008 | Spitz | 411/174 |
| 2008/0159824 A1 * | 7/2008 | Okada et al. | 411/177 |
| 2008/0286066 A1 * | 11/2008 | Paquet | 411/177 |
| 2009/0003961 A1 * | 1/2009 | Benkel et al. | 411/190 |
| 2011/0311331 A1 * | 12/2011 | Tejero Salinero | 411/175 |
| 2013/0017033 A1 * | 1/2013 | Brown | 411/112 |
| 2013/0101370 A1 * | 4/2013 | Kuhm et al. | 411/172 |
| 2013/0283576 A1 * | 10/2013 | Bozinovski | 24/543 |

FOREIGN PATENT DOCUMENTS

| | | |
|---|---|---|
| ES | 2283915 T3 | 11/2007 |
| ES | 2300367 T3 | 6/2008 |
| WO | 9921729 A1 | 5/1999 |

\* cited by examiner

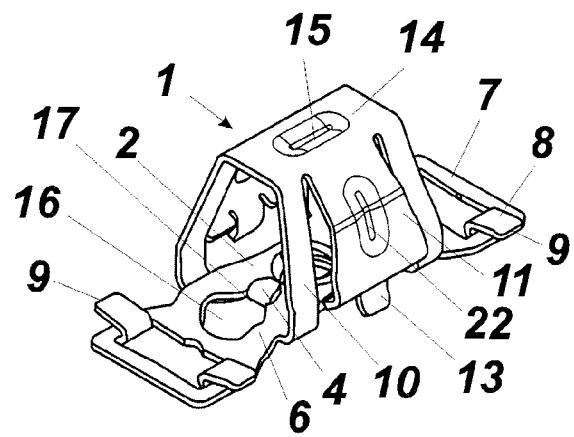
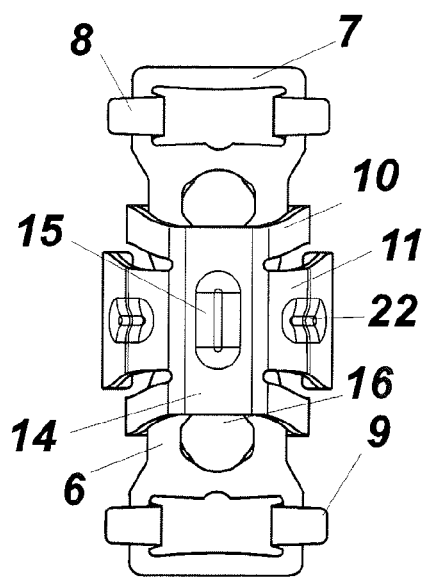
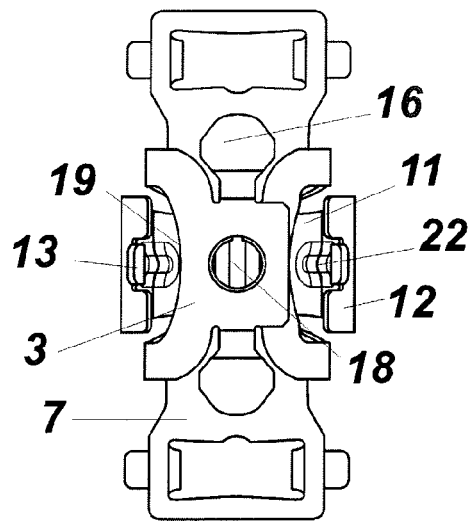
Fig. 6
Fig. 7
Fig. 8

ROOF CLIP FOR FASTENING ACCESSORIES TO THE PANELS OF VEHICLES

RELATED APPLICATIONS

The present application is national phase of PCT/ES2010/000184 filed Apr. 27, 2010, and claims priority from Spanish Application Number P200901700 filed Jul. 31, 2009.

FIELD OF THE INVENTION

The object of the present invention pertains to a roof clip of the type used in the automobile industry for securing accessories to the panels of vehicles, wherein the piece has been optimized in order to obtain low insertion force and has been especially designed for the modular assembly system of the roof while providing at the same time a strong fastening, with high extraction force once the clip is assembled on the application and with the possibility of disassembling the piece from the panel, thereby keeping undesired noises from occurring in the clip itself whenever it receives the expected force and permitting the adaptation of the clip to a range of thicknesses of said panel owing to its constructional shape.

PRIOR ART

Roof clips are known for attaching accessories to the panels of vehicles in the automobile industry. One of their peculiarities is that due to working reasons they are assembled in slots provided in said panels so that the only access to them is gained from the inner side of the vehicle, which inner side is exterior to said insertion slot.

Said type of clips are provided with a portion that can be inserted into said slot and that is usually is provided with flexible wings which expand and act as abutments thereby preventing the inverse travel of the clip when the surface of the panel is fully pierced through. Said clips, both in the variants thereof and in the present invention, which depending on the particular embodiment are provided with a thread and an orifice for the use of a screw, feature a base with a threading element, it being either single-threaded or multi-threaded, such as for instance a threaded cylinder that rises and moves into the inner area of the panel, that is, where the screw is inserted.

For instance, Spanish patent ES2107378 develops a clip of this type that is provided with a base having side wings, a threaded orifice for the passage of a screw and arms and flaps that altogether converge in their elongation towards the inside of the panel, said flaps being responsible for performing the retention of the clip in the panel.

Generally speaking, it is safe to state that it is convenient to utilize clips having an overall conical configuration for facilitating the task of their insertion in the installation slot or orifice made in the panel of the vehicle. The present invention goes one step further as it develops an approximately inverted "V"-shaped overall configuration having at its vertex a head or central surface, devoid of independent arms, that supports, in a configuration inverse to the one used in the above-mentioned patent, the fastening flaps in the panel. In the invention said flaps give continuity to said surface, which is located at the furthest area from the base of the panel.

Our Spanish patent application no 200900740 develops a clip that, despite featuring in its idle condition an overall vault and/or cone-shaped configuration and having a head or rounded central surface, has laterally-extending flexible legs for attaching the fastener to said clip from said head or rounded central surface, said legs having a fold from which they extend to form inner flaps having a slot for fastening to the retainer.

Conversely, the present invention develops a clip intended to be secured by means of a screw. It is precisely another one of the main objects of the present invention to increase the tightening torque for the attachment of accessories in this type of clips through the incorporation of a threaded tube or the use of a double thread.

It is yet another one of the advantages sought by the present invention to facilitate the adaptation of the clip during installation in the panel, thereby increasing the engagement and stability of same upon assembly in order to permit the increase of, as compared to other existing configurations, the range of thicknesses of the panel permitting the assembly of the clip of the invention, while avoiding at the same time the undesired noise arising from the use thereof and resulting, for instance, from the vibrations of the vehicle.

These and other advantages of the present invention will become more apparent throughout the description thereof.

BRIEF EXPLANATION OF THE INVENTION

The present invention describes a roof clip of the type used for attaching accessories to the panels of vehicles, wherein once the accessory has previously been assembled on the modular system of the roof and secured to the clip by means of a screw, both are inserted into a slot made in said panels.

In the clip of the invention the wings for retention to the panels are disposed from an upper surface attached to the intermediate base by means of arms. Said upper surface with an overall inverted "V"-shaped configuration can be flat or blunt, feature a narrow width and, depending on the needs of the application, it can incorporate a drill or reinforcement intended to decrease the insertion force or increase the extraction force, respectively.

The panel retention wings feature a progressive entry into the panel thanks to a progressive change in their inclination or an intermediate folding. Locking of the clip in the panel is obtained via either retention surfaces located at the end of the wings or a retention fold. Disassembling of the clip is possible by closing the retention wings thanks to flanges provided in said wings.

The intermediate folding and/or the progressive change of inclination of the retention wings can incorporate, if need be, reinforcements for avoiding the premature deformation thereof when the extraction force is applied.

Besides, the progressive and smooth lateral shape of the arms attaching the upper surface to the intermediate base facilitates correct alignment and subsequent insertion into the panel slot thereby reducing the insertion force required.

The intermediate base has at the side elongations thereof respective wings transversally extending with respect to the clip, which wings in turn split into wings forming a "V" with the ends thereof located on a higher plane than that of the clip and featuring protuberances. Such configuration provides elasticity reserve to the assembly and prevents the occurrence of undesired noises caused by the vehicle vibrations thanks to the occasional and rounded contact of the protuberances, which are devoid of sharp edges that might damage the panel.

It is to be noted that in the different embodiments the contact surfaces of the clip with the exterior portion of the panel lie at an extended distance from the center of the clip, both longitudinally and transversally speaking.

In some embodiments said intermediate base may be provided with a step with respect to the plane of said wings. Some of such wings are provided with flanges for contact with the panel, these flanges have rounded ends. It is worth noting that in the preferred embodiment the folds provided at the ends of the retention wings prevent both the longitudinal displacement of the clip, particularly when force in such direction is applied on the levers, and the damage of the panel if there appeared any sharp edges.

An alternative solution to the above-described preferred invention is to integrate in the clip wings made of suitable plastic material in order that contact of the clip base with the metallic panel be also flexible and devoid of noises.

The intermediate base is provided with slots for the engagement of the rods securing the accessories to be installed and notches located in the proximity of the center of the clip permitting the folding of respective centering flanges that secure the lower base, thereby ensuring that the respective orifices for passage of the fixing screw are correctly aligned.

Thanks to its being provided with a double base, the clip of invention includes an orifice, at the lower base, and another orifice with a threaded tube or with a single-threaded helical thread at the intermediate base. Such configuration provides a stable and rigid supporting metal base during the tightening operation of the screw, this thus keeping the thread from directly resting on the plastic surface of the accessory, which increases the tightening torque to be applied on the clip-accessory engagement.

Complementary to the preferred solution, this double base system permits to provide some embodiments with respective double threads, one at either base, these being suitably spaced apart so that they can adequately adapt to the passage of the screw that is being used.

In this way the inventive objects sought are achieved, since the clip is easily positioned and assembled thanks to its approximately inverted "V" shape with a central surface that facilitates its alignment and insertion into the panel in combination with the progressive entries of the retention wings and the also progressive and smooth lateral external shape of the arms connecting the upper surface with the intermediate base.

The clip is highly stable thanks to the fact that in its configuration there exist no elements causing friction with each other or free ends which may vibrate and/or interact with adjacent elements, thereby making noises, and also thanks to the fact that the flexible support legs of the wings permit a correct adaptation of the clip to a range of thicknesses of the panel so that the final insertion force can be reduced.

Finally, the clip is of the dismountable type, upon installation, thanks to having disassembly flanges that facilitate extraction thereof.

BRIEF EXPLANATION OF THE DRAWINGS

For a better understanding of the invention it is accompanied by six sheets of merely illustrative and non-limiting drawings.

FIG. 6 shows a perspective view of another possible embodiment of the present invention.

FIG. 7 shows an upper plan view of the clip of the previous figure.

FIG. 8 shows lower plan view of the clip of FIGS. 6 and 7.

DETAILED EXPLANATION OF THE INVENTION

Figure 1:
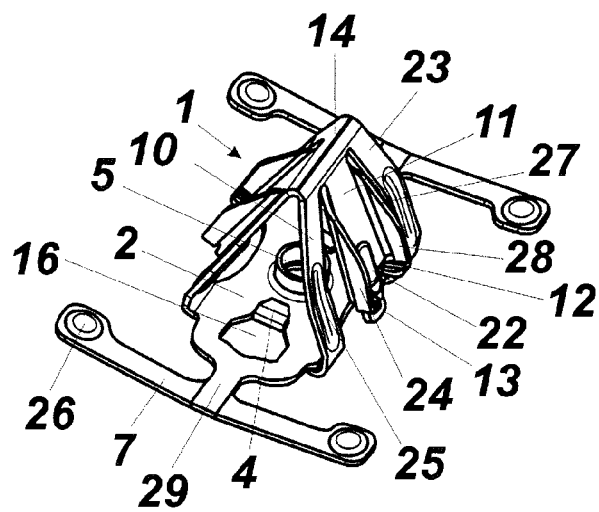
FIG. 1 shows a perspective upper view of the preferred embodiment of the clip of the present invention.
Figure 2:
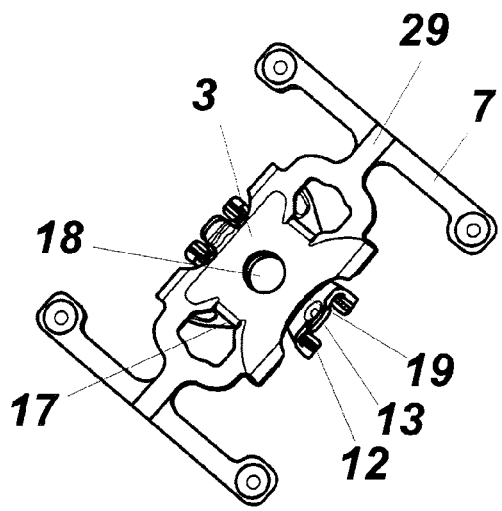
FIG. 2 shows perspective view from a lower position than the perspective of the clip of the previous figure.
Figure 3:
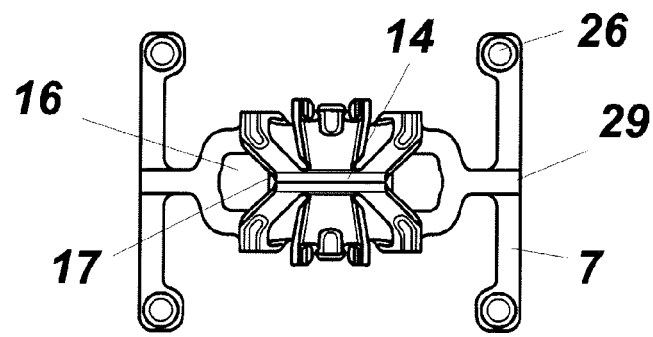
FIG. 3 shows a plan view of the clip of the previous figures.
Figure 4:
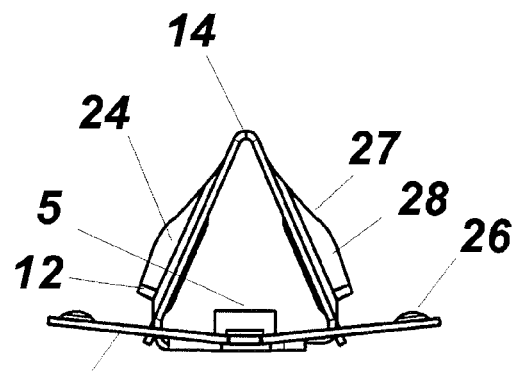
FIG. 4 shows a side elevational view of the clip of the previous figures.
Figure 5:
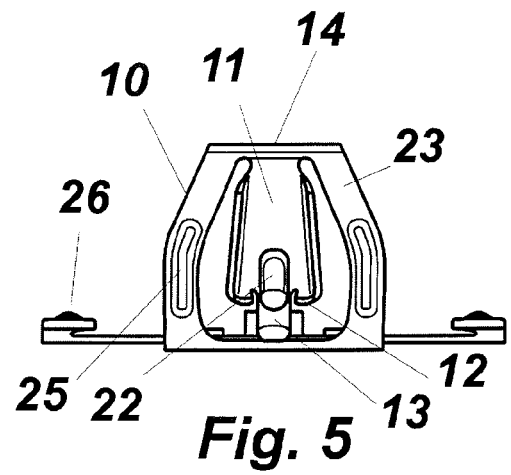
FIG. 5 shows a side elevational view of the clip of the previous figures, in an orthogonal position with respect to the preceding figure.
Figure 9:
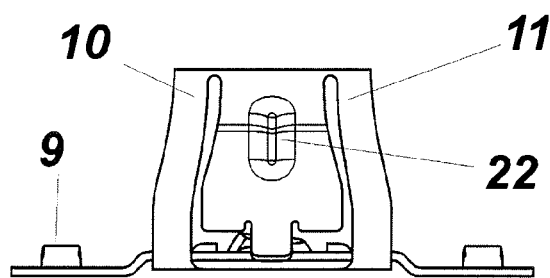
FIG. 9 shows a side elevational view of the clip of FIGS. 6, 7 and 8.
Figure 10:
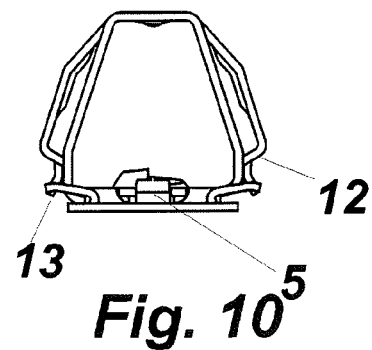
FIG. 10 shows a transversal section, with respect to the longest longitudinal direction thereof, of the clip of the preceding figure.

The present invention comprises a roof clip of the type used for attaching accessories to the panels of vehicles and inserted slots made in said panels, wherein once the clip is assembled on the modular system of the roof, along with the accessory thereof, and secured by means of a screw, the entire modular system is installed on the roof panel, which panel is provided with a base (2) having a threaded orifice, slots (16) at said base (2) for the engagement with the positioning elements of the accessory to be installed with the clip (1), it being provided with fastening wings (11) of the clip (1) to the vehicle panel thanks to a contact surface (12) with said panel, the invention being also provided with flanges (13) for extracting said clip from said panel, wherein there has been performed the overlapping of a lower base (3) with said intermediate base (2) while keeping aligned the thread (5) of said intermediate base (2) and the lower orifice (18) of said lower base (3).

The superposition of bases (2 and 3) is obtained, as seen in the figures accompanying the invention, thanks to the overlapping of said lower base (3) underneath the intermediate base (2) resulting from folding and forming the conical body of the clip with an upper surface (14), blunt and narrow, or approximately flat, depending on each actual embodiment, from which arms (10) attaching said surface to said bases (2 and 3) and descending side wings (11) extend.

Said side wings (11) permit, thanks to a fold made towards the interior of the clip, a support and contact surface (12) of said wings (11) against the edges of the orifice or slot made in the panel. Said contact or abutment keeps the clip (1) from exiting said slot panel.

In the preferred embodiment, shown in FIGS. 1 to 5, the side wings (11) feature elbowed side surfaces (24). Said surfaces are subdivided into two portions, a first portion (27) located at the area adjacent to the vertex of the clip (1), the surface (14), which is the surface having the most inclination with respect to the vertical, and a second portion (28) that features an enlarged surface.

The purpose of the above subdivided shape is on the one hand to provide a gradient suitable for diminishing the entry and insertion force into the panel and at the same time to provide said wing (11) with a suitable resistant working area.

In this preferred embodiment, the contact and engagement surface (12) of said wings (11) with the panel comprises elongated flanges that are folded against the surface of said panel and secured to the ends of the elbowed side surfaces (24) of the wings (11).

The extraction flanges (13) of the clip are disposed descending downwardly from said wings (11). When, upon engagement of the clip (1) with the panel, said flanges (13) become attracted towards the center of the clip the engagement of the surfaces (12) is released and the clip is freed from the panel.

In order to facilitate the above operation, the base of the clip (1) is provided at its side with a rebated surface (19).

Said wings (11) and said flanges (13) can feature reinforcing deformations (22).

Likewise, the arms (10) securing said bases (2 and 3) to the surface (14), which is narrow in the preferred embodiment shown in FIGS. 1 to 5, have two portions, the first one (23) being adjacent to said surface (14) and having a higher degree of incline with respect to the vertical of the clip (1) in order to facilitate the entry thereof into the orifice of the panel.

The arms, if need be, (10) may be provided with reinforcements (25), for instance in the form of deformations of the surface thereof.

The base (2) of the clip extends in the largest longitudinal direction in order to form transverse wings (7) that work against the panel on the face opposed to that of the surface (12) of said wings (11).

The surface of said transverse wings (7) that is intended to be brought into contact with the panel is provided with reliefs against friction with said panel in the form of support protuberances (26). Said protuberances or other similar type of formations are intended to avoid contact areas between the clip (1) and the sharp-edged panel, thereby diminishing the noise resulting from the friction between both.

The joining between said base (2) and said wings (7) is made in the examples of FIGS. 1 to 5 by means of a longitudinal tongue (29).

As seen in FIGS. 1 to 5 of said embodiment, contact surfaces of the clip (1) with the exterior of the panel, the protuberances (26), lie at an enlarged distance with respect to the center of the clip, both in the longitudinal direction and in the transverse direction thereof.

This construction and the fact that from a sectional point of view the wings (7) are "V"-shaped provide suitable operational elasticity reserve and good adaptation to different panel thicknesses, said "V" being centered on the axis of the clip and having the ends thereof located at the ends of the wings and the protuberances (26) raised with respect to the plane of said clip.

In another of the preferred embodiments, the one shown in FIGS. 6 to 11, the side wings (11) feature an intermediate fold and/or a progressive change in the inclination of said wing, which can also incorporate reinforcements (22) in order to prevent the premature deformation thereof when the extraction force is applied.

This clip (1) also incorporates a simple means for extraction from the panel slot, consisting in the presence of flanges (13) that extend into said side wings (11) and further extend from said engagement surface (12). Upon exertion of pressure on said flanges (13), the surface (12) and the wings (11) can be released from the edges of the panel slot, thereby freeing the clip (1).

The lower base (3) is provided with fastening flanges (4) that are folded over the surface or intermediate base (2) into notches (17) made in the slots (16) of said base (2) of the clip. The slots (16) are intended to house the elements for fastening the accessories assembled with the clip (1).

Said notches (17) are intended to have said flanges fitted into them, without plays, this resulting in a secure and stable fastening devoid of mutual side displacements of the surfaces or bases (3 and 2) prior to the screwing of the accessory to be fastened to the clip (1).

In some embodiments the intermediate base (2) can feature at its side extensions of the longer longitudinal direction a step (6) located on a plane approximately identical to that of said lower base (3) and wings (7) transversally extending towards the longer longitudinal direction of the clip. These wings (7) can incorporate respective reinforcing flanges (8) that extend further in said transverse direction.

This construction provides several outcomes worth noting. On the one hand, it is diminished the contact surface between the piece or clip (1), at the area of the wings (7) and the panel surface, and on the other hand this mutual relation has some degree of elasticity resulting from the relative rigidity of said flanges (8). A fold (9) at the end of said flanges (8) avoids any kind of aggression to them against the panel surface.

This type of clip can incorporate a reinforcement (15) or a drill (15') on the flat surface (14), if required by the application, so that in case a reinforcement (15) is used the extraction force can be increased or, in case the drill (15') is used the insertion force can be diminished and the reliability in the manufacture of the clip itself can be improved.

There may be different surface (14) combinations, flat or blunt, with the possibility of having said drill (15') or said cavity or reinforcement (15) available. Said flat or blunt surface (14), or like in the preferred embodiment a particularly flat surface, can be adapted to the insertion slot of the panel, which facilitates the insertion thereof.

It is worth noting that not only the conical shape of the central portion of the clip (1) facilitates the insertion thereof, but also the very structure of the clip (1) provided with a blunt surface, or approximately flat, or particularly narrow (14), from which extend said wings (11), that are provided with a progressive entry into the panel by way of a progressive change of inclination thereof, along with the also progressive external lateral shape of the arms attaching the upper blunt surface to the bases, all of which facilitates the correct alignment and subsequent insertion into the panel slot, helps assembling and considerably reduces the required insertion force.

Similarly, it is provided a notch (19) in said base of the clip (2) that is basically intended to permit the operation of the tool suitable for disassembling the clip, thereby facilitating access to the extraction flanges (13) of the clip.

The incorporation of protuberances (26) for support or flexible flanges (8) on the wings (7) considerably reduces, as compared to the winged base configuration of Spanish patent ES2107378, the final force required to insert the clip into the panel.

Figure 12:
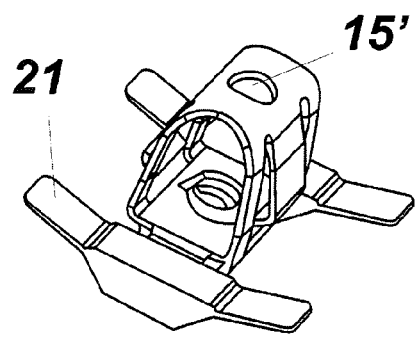
FIG. 12 shows a perspective view of another embodiment of the invention, similar to the one represented in the preceding figures, but with an overall vault-shaped and/or conical configuration, provided with a head or rounded central surface, double thread, one in each base, and extreme composition parts that can be made of plastic.
Figure 13:
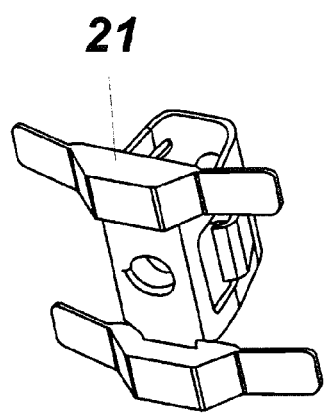
FIG. 13 is a perspective representation, in a lower view, of the embodiment of the previous figure.

Another possible embodiment of the present invention is shown in FIGS. 12 and 13. In these cases there also exists the overlapping of a lower base (3) and an intermediate base (2) that keeps aligned, for this configuration, a double thread given the fact that each base incorporates a single thread and they are conveniently spaced from each other so that each base can adequately adapt for passage of the screw that is in operation.

An addition feature of this embodiment is that the wings (7) and the support flanges have been replaced by support wings, in an independent body (21), that are made of plastic material and are either integrated in the clip, directly injected in the clip or assembled under pressure and fitted into the flaps (20) provided in both bases. In this manner, the very plastic piece ensures the engagement as a whole of the two bases and at the same time provides a low insertion force. It is to be noted the reduced weight of this embodiment since it incorporates two pieces made of plastic material.

Figure 14:
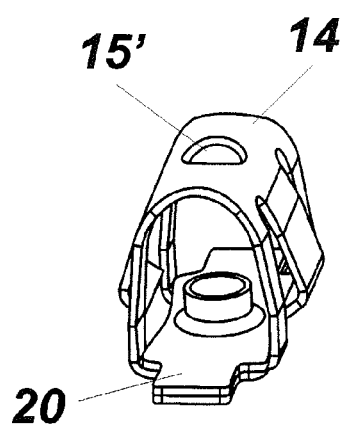
FIG. 14 is another perspective representation that may correspond to the two previous figures, with the peculiarity that it utilizes a threaded cylinder as a threaded element. The graphic merely shows the central portion, without the addition of the end wings.

In FIG. 14 it is represented a variation of the previous embodiment, since it incorporates a threaded tube at the intermediate base and an orifice at the lower base. With that it is achieved, like in the preferred embodiment of FIGS. 1 to 5, an increase of the tightening torque in those applications requiring it.

Figure 15:
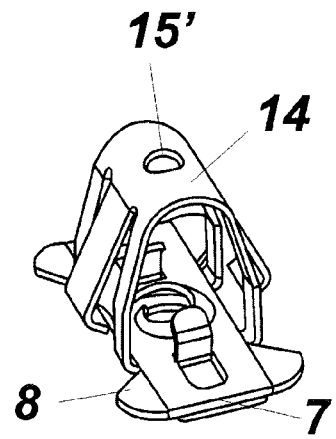
FIG. 15 also shows another possible embodiment of the present invention. In point of fact, several combinations of the elements forming the clip are possible without departing from the essence of the present invention.

In the embodiment shown in FIG. 15, said wings (7) and flanges (8) are formed by the overlapping of the lower base (3) and said intermediate base (2). For instance, the intermediate base (2) extends transversally in the larger longitudinal direction of the clip (1) in the form of flanges (8) that protrude from the body of said lower base (3).

Figure 11:
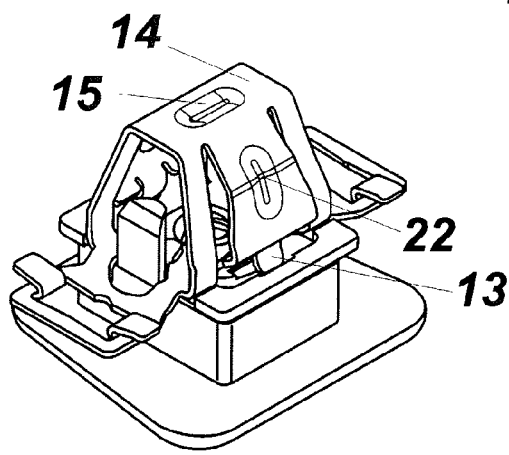
FIG. 11 shows one of the possible embodiments of the invention, specifically, the one represented by FIGS. 6 to 10, wherein it is schematically shown the assembling of the clip.

FIG. 11 shows an application of the invention in which it is worth noting the reduced dimensions of the clip so that it can adapt to those situations in which the assembling space is reduced.

Figure 16:
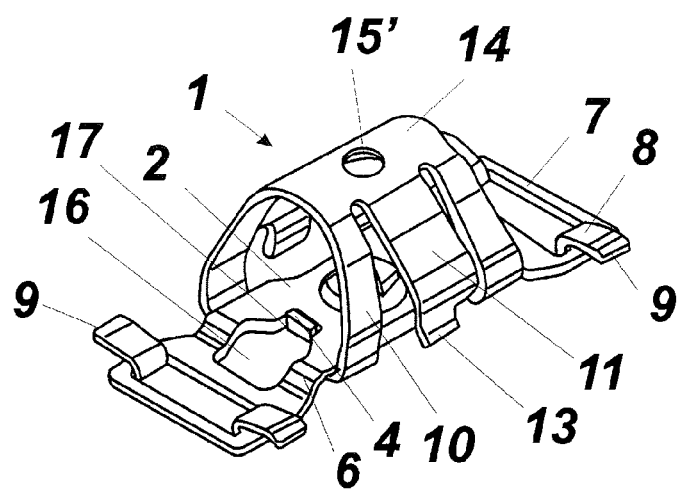
FIG. 16 is another of the preferred possible embodiments of the invention, wherein the upper surface is blunt and has an orifice and side wings that are smooth, devoid of reinforcing deformations, these being elements that can be utilized in different combinations depending on the operational requirements of the piece without this affecting the essence of the invention.

Finally, FIG. 16 shows another possible embodiment of the invention. In this case the upper surface (14) is blunt and provided with a drill (15'). Further, the side wings (11) are smooth and devoid of the reinforcements (22) present in other embodiments.

In this case the thread is formed through the overlapping of a lower base (3) and its intermediate base (2) that keeps aligned the lower orifice of said lower base and the thread (5) of said intermediate base (2).

It is understood that finish or shape details in the present case are liable to variation provided that the essence of the invention is not altered.

The invention claimed is:

1. A roof clip for fastening, configured to be inserted into a slot made in a panel of a vehicle, said clip comprising:
A monolithic component including:
an intermediate base having first arms extending from the intermediate base, a threaded orifice established by a thread of the orifice, and slots in said intermediate base;
a lower base having second arms extending from the lower base, and a lower orifice, said lower base overlaps said intermediate base, such that said threaded orifice of said intermediate base and said lower orifice of said lower base being aligned for passage of a screw therethrough, said lower base is provided with fastening flanges that are folded onto said intermediate base through said slots of said intermediate base;
an upper surface portion, said upper surface portion having side wings extending therefrom, and wherein said first arms and said second arms are also connected to said upper surface portion, each of said side wings whose folding creates a contact surface with said panel, each of said wings being provided with flanges for extracting said clip from said panel; and
wherein the first arms are connected to the intermediate base at a first folded connection, and wherein the second arms are connected to the lower base at a second folded connection, and wherein the intermediate base, the lower base, and the upper surface portion form the monolithic component.

2. THE ROOF CLIP, according to claim 1, CHARACTERIZED wherein each of said arms form an overall inverted "V"-shaped configuration with an apex end thereof terminating in said upper surface portion.

3. THE ROOF CLIP, according to claim 2, CHARACTERIZED by featuring reinforcements in each of said arms.

4. THE ROOF CLIP, according to claim 2, CHARACTERIZED in that said side wings are provided with respective elbowed side surfaces.

5. THE ROOF CLIP, according to claim 4, CHARACTERIZED in that said elbowed side surfaces feature a first portion having a steeper inclination with respect to the vertical in its area closest to said upper surface portion, and a second portion having an enlarged surface.

6. THE ROOF CLIP, according to claim 4, CHARACTERIZED in that said upper surface portion is formed by elongated flanges that are bent against the surface of said panel and secured to the ends of the elbowed side surfaces of the side wings.

7. THE ROOF CLIP, according to claim 1, CHARACTERIZED in that said flanges and said wings can be provided with reinforcements on the surface thereof.

8. THE ROOF CLIP, according to claim 1, CHARACTERIZED in that said intermediate base is provided with a notch located in a slot of said intermediate base intended to facilitate access to flanges in the dismantling operation of the clip.

9. THE ROOF CLIP, according to claim 1, CHARACTERIZED in that said thread of said intermediate base is located in a threaded cylinder.

10. THE ROOF CLIP, according to claim 1, CHARACTERIZED in that said roof clip is provided with notches made in said slots of said base of the clip wherein said fastening flanges of said lower base are folded onto said surface or intermediate base.

11. THE ROOF CLIP, according to claim 1, CHARACTERIZED in that the lower orifice of said lower base is also threaded.

12. THE ROOF CLIP, according to claim 1, CHARACTERIZED in that the contact surfaces of the clip with an external portion of the panel are located at an extended distance from the center of the clip, both longitudinally and transversally with respect to an axis running lengthwise through said roof clip.

13. THE ROOF CLIP, according to claim 2, CHARACTERIZED in that said clip features wings extending in a lengthwise direction from the intermediate base.

14. THE ROOF CLIP, according to claim 2, CHARACTERIZED in that said upper surface portion is blunt.

15. THE ROOF CLIP, according to claim 2, CHARACTERIZED in that said upper surface portion is approximately pointed and narrow.

16. THE ROOF CLIP, according to claim 2, CHARACTERIZED in that said upper surface portion is flat.

17. THE ROOF CLIP, according to claim 2, CHARACTERIZED in that said upper surface portion is provided with a notch in the form of an orifice.

18. THE ROOF CLIP, according to claim 2, CHARACTERIZED in that said upper surface portion is provided with a reinforced portion on the surface thereof in order to improve ease of extraction of said roof clip from the panel.

19. THE ROOF CLIP, according to claim 1, CHARACTERIZED in that said side wings transversally extend in said larger longitudinal direction of the clip and have the ends thereof raised approximately in the form of a "V" centered on the axis of said clip.

20. THE ROOF CLIP, according to claim 1, CHARACTERIZED in that said roof clip is provided with support protuberances at the ends of said side wings.

21. THE ROOF CLIP, according to claim 13, CHARACTERIZED in that said intermediate base and said wings are joined by a longitudinal tongue.

22. THE ROOF CLIP, according to claim 13, CHARACTERIZED in that said intermediate base and said lower base overlap each other and said wings are formed by extensions in the longitudinal direction along a lengthwise axis running through said clip.

23. THE ROOF CLIP, according to claim 1, CHARACTERIZED in that the wings are attached to said clip via an independent body, and said clip further includes flaps in each of the intermediate and lower base where said independent body is attached.

24. THE ROOF CLIP, according to claim 23, CHARACTERIZED in that said independent body is made of plastic material or plastic composite.

25. THE ROOF CLIP, according to claim 1, wherein the roof clip is configured for fastening accessories to panels of vehicles.

* * * * *